Jan. 29, 1929.
J. W. HOLT
1,700,408
ELECTRIC WELDING MECHANISM
Filed Oct. 27, 1924
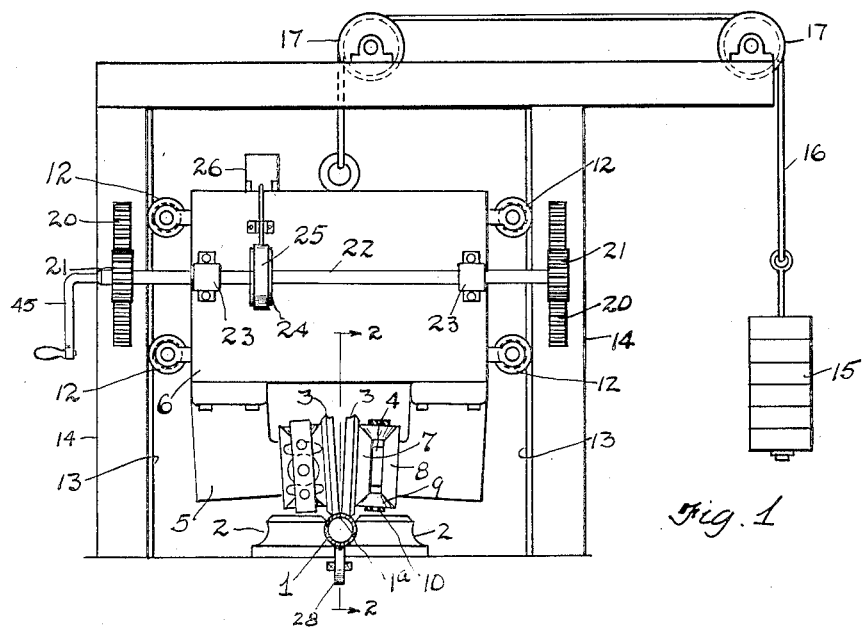
Fig. 1
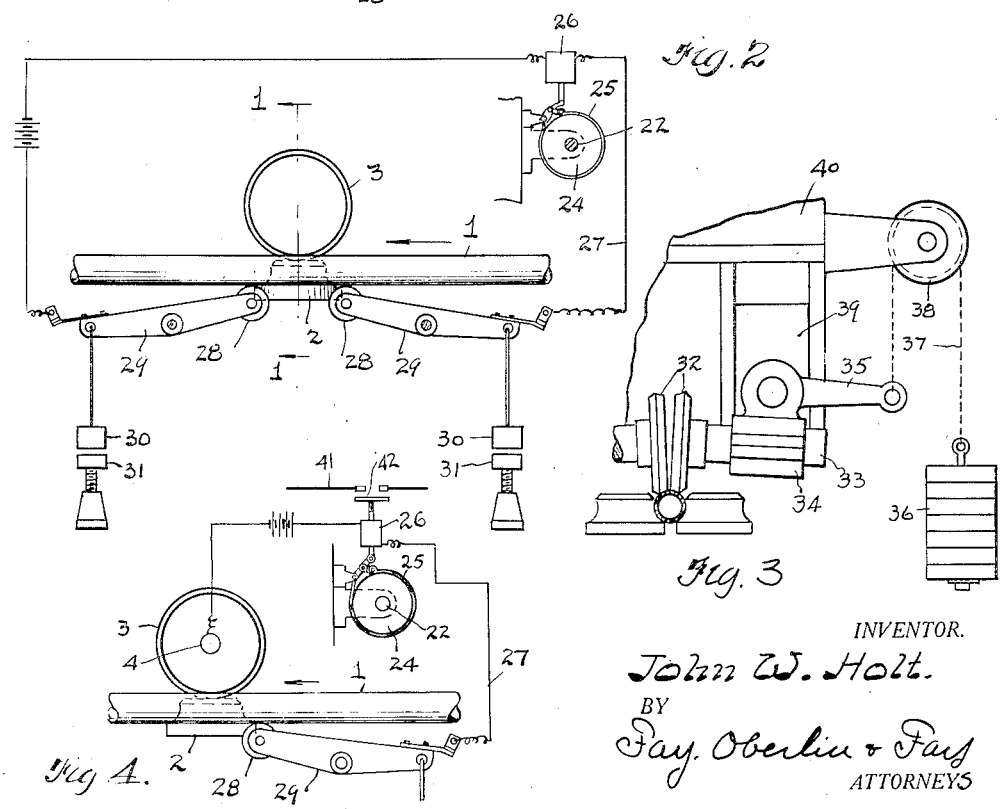
Fig. 2
Fig. 3
Fig. 4
INVENTOR.
John W. Holt.
BY
Fay, Oberlin & Fay
ATTORNEYS Patented Jan. 29, 1929.

1,700,408

UNITED STATES PATENT OFFICE.

JOHN W. HOLT, OF CLEVELAND, OHIO.

ELECTRIC WELDING MECHANISM.

Application filed October 27, 1924. Serial No. 745,981.

In electric welding mechanism designed for butt-welding the edges of preformed metal tubes and like articles after the fashion illustrated in U. S. Letters Patent No. 658,741 to O. Parpart, dated September 25, 1900, it is a matter of importance that the pressure of the electrode rolls on the edges of the tube which are to be welded together should be at all times uniform in the case of any particular operation; also that such pressure, while automatically applied, should be capable of nice regulation.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a broken front elevational view of an electric welding machine embodying my present improvements; Fig. 2 is a broken side elevation thereof, partly diagrammatic in character; and Figs. 3 and 4 are views, similar to Fig. 1, but illustrating modifications in construction.

The general arrangement of the operating parts of my improved welding mechanism need only be briefly described. The work, consisting of a preformed tube 1 or like article, is held with the edges thereof which are to be welded together in proper abutting relation by means of two pressure rolls 2, which may be positively driven to feed such work through, or if preferred such feeding may be accomplished by separate feed rolls (not shown) which act either alone or in conjunction with such pressure rolls. The welding electrodes 3 in themselves are of familiar design, consisting of annular disks usually made of copper and having their peripheral edges formed to contact with the work on either side of the seam 1ª therein, the work being guided so as to expose such seam midway between the pressure rolls 2. The upper faces of the latter, it will be observed, are beveled and the peripheral edges of the electrode rolls are formed with a complementary bevel as well as with a transversely concaved section that conforms to the curvature of the work.

The opposed faces of the electrode rolls are shown as inclined at a slight angle to a vertical line passing centrally through the work so as to afford proper clearance, and the axes of said rolls are correspondingly inclined with respect to a horizontal line, but this is not essential.

While the particular manner in which said electrode rolls are supported forms no part of the present invention, they will preferably be mounted in the manner shown and claimed in my co-pending application filed October 27, 1921, Serial No. 510,700. Briefly, the spindles 4 which carry the rolls are journaled in suitable housings 5 that are attached to the under side of the transformer frame 6, the current being conducted from the transformer to the rolls through two oppositely facing beveled rings 7 and 8 in the V-shaped annular groove between which a series of conical rollers 9 is carried by means of a floating ring 10. The foregoing construction enables the current to be carried directly to the electrode rolls without having to pass through the bearings whereby said rolls are supported; in fact, such bearings may be entirely insulated against the passage of any current therethrough.

As previously indicated, the present invention relates primarily to the means provided for obtaining, within reasonable limits, a known constant and adjustable pressure between the electrode rolls 3 and the work 1. To this end, the transformer frame 6 with attached housings 5 is mounted in such a way that it may be moved towards or away from the work as desired, thus simultaneously moving the electrode towards and away from the work. While such capacity for movement of the transformer frame and attached parts may be accomplished in various ways, the preferred construction is to provide said frame on each side with flanged rollers 12 that engage with vertical rails or guides 13 in the side members 14 of the main frame of the machine. Since ordinarily the weight of the transformer assembly will apply a greater pressure through the electrode rolls to the work than desired, such assembly should be counterbalanced in some suitable way. As shown, an adjustable counterweight 15 is attached to the transformer frame 6 through a cable 16 running over pulleys 17 in such manner as to leave any desired excess of weight on the transformer side. In order to adjust the amount of the pressure thus applied to the work through the electrode rolls, it is only necessary to vary the counterweight 15, as will be readily understood. In place of such counterweight, a hydraulic air or steam cylinder may be used or suitable spring mechanism.

Attached to each of the side members 14 of the main frame so as to lie parallel with the direction of movement of the transformer frame 6 is a rack 20 wherewith engages a pinion 21 fixed on the corresponding end of a transverse shaft 22 mounted in suitable bearings 23 on the transformer frame. A brake drum 24 is fixedly mounted on said shaft, preferably between the two bearings 23, and co-operative with said drum I provide a brake band 25 that is adapted to be applied or set by means of a solenoid 26, likewise mounted on the transformer frame. When thus set, the brake device just described will obviously prevent any vertical movement of the transformer assembly by locking the pinions 21 with the corresponding racks 20.

In the arrangement illustrated, the solenoid is designed normally to be energized and in this condition to release the brake; conversely, interruption of the current through the solenoid will set the brake. The circuit 27, through which current is thus supplied to the solenoid, is controlled by means of two small contact rolls 28 conveniently mounted on rockers 29 immediately below the path of the tube 1, one such roll being thus supported just in front and the other just back of the pressure rolls 2. Connected with the outer ends of the respective rockers 29 are weights 30 which tend to raise the contact rolls until such weights rest on adjustable stops 31 which determine the maximum elevation of the contact rolls. These will be normally positioned by means just described so that when a tube is being passed through the machine, it will slightly depress the contact rolls and close the circuit 27, the branches of which are respectively connected with the rockers 29.

As a result of the foregoing construction, it will be seen that when a tube is being passed through the machine, the brake device is released and the transformer assembly will cause a pressure to be exerted through the electrode rolls onto the tube dependent upon the amount to which said assembly overbalances counterweight 15. However, as the end of any particular tube clears the advance contact roll 28, the circuit 27 is instantly broken and the brake device is set and so automatically prevents the transformer assembly from dropping until the next tube is started through.

Instead of applying pressure simultaneously and in the same amount to both electrode rolls 3, I may provide individual pressure applying means to each such roll, thus permitting of individual adjustment. This modification in construction is illustrated in Fig. 3 where the electrode rolls 32, here shown as of standard construction, are carried by spindles 33 mounted in oscillatory housings 34. Projecting from each housing is an arm 35 to which is attached a counterweight 36 through the medium of a sprocket chain 37 passing over a sprocket wheel 38. The housings 34 may be carried by adjustable slides 39 so that their position with respect to the transformer frame 40, which here is fixed in position, may be varied to accommodate the rolls to tubes of different diameters. Whatever the position of such slides, it will be evident that the electrodes 32 may be applied to the work under any degree of pressure as determined by counter-weights 36 operating through the leverage afforded by the sheaves or pulleys 38 and the arms 35. To prevent the electrode rolls from dropping too far, the same method of automatic control, as shown in Figs. 1 and 2, may be employed.

It should also be noted that where such automatic control of the pressure applying means is provided, the main welding circuit may be controlled by the same contact rolls 28 that control the operation of the brake device in Figs. 1 and 2. In other words, the rocker 29 may be connected either directly or through a suitable relay with a switch in such main welding circuit so as to cut off the current to the welding electrodes 3 and thus prevent burning thereof whenever the welding operation is interrupted by the complete passage of a tube through the machine. As shown in Fig. 4, the solenoid 26 is utilized as a relay thus to control the main welding circuit 41, being connected with this object in view to a switch 42 in such circuit, so as to operate said switch at the same time the brake on shaft 22 is operated.

In Fig. 4, there is also shown a further modification in that only one contact 28 and corresponding rocker 29 are employed to control circuit 27. Such contact will be located on the entering side of the machine and the circuit is completed through the electrode roll 3, the spindle 4 of said roll being connected with the other branch of the circuit. The use of a single contact 28 has an advantage over the construction shown in Fig. 2, in that it renders impossible the closing of the solenoid circuit by passing successive tubes through so closely as to make an electrical connection by way of the pressure and electrode rolls.

It will be understood that in each of the foregoing forms of my welding machine the transformer, or the frame that carries the same, will require to be suitably insulated, and that insulation will be provided at other points as usual. Also for the purpose of raising or lowering the transformer with attached parts in setting the machine, a crank 45 may be fitted on one end of shaft 22.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; and means adapted to limit movement of said electrode roll when out of contact with such tube.

2. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; and means controlled by the passage of such tube through the machine adapted to limit movement of said electrode roll when out of contact with such tube.

3. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; and electromagnetic means controlled by the passage of such tube through the machine adapted to limit movement of said electrode roll when out of contact with such tube.

4. In electric welding mechanism, the combination of guide means adapted to maintain the edges of a preliminarily formed tube or like article in substantial contact; an electrode roll adapted to contact with such tube; and means controlled by the passage of such tube through the machine adapted to time the closing and the opening of the welding circuit in accordance with the position of the tube.

5. In electric welding mechanism, the combination of guide means adapted to maintain the edges of a preliminarily formed tube or like article in substantial contact; weighting means including a transformer supported over said means so as to be movable towards and from the same; two electrode rolls carried by and electrically connected with said transformer, said rolls being adapted in one position of said transformer to contact with the respective edges of such tube; and adjustable counterweight means connected with said transformer, whereby the pressure of said rolls on the tube may be determined.

6. In electric welding mechanism, the combination of guide means adapted to maintain the edges of a preliminarily formed tube or like article in substantial contact; a transformer supported over said means so as to be movable towards and from the same; two electrode rolls carried by and electrically connected with said transformer, said rolls being adapted in one position of said transformer to contact with the respective edges of such tube; adjustable means, whereby the pressure of such contact may be determined; and means adapted to limit movement of said transformer when out of contact with such tube.

7. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; means adapted to limit movement of said electrode roll when out of contact with such tube; and a switch controlling the welding circuit, said last-named means being operatively connected with said switch.

8. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; means controlled by the passage of such tube through the machine adapted to limit movement of said electrode roll when out of contact with such tube; and a switch controlling the welding circuit, said last-named means being operatively connected with said switch.

9. In electric welding mechanism, the combination of guide means adapted to maintain the edges of a preliminarily formed tube or like article in substantial contact; an electrode roll movably mounted with respect to such tube; adjustable means adapted to hold said electrode roll against such tube under predetermined pressure; electromagnetic means controlled by the passage of such tube through the machine adapted to limit movement of said electrode roll when out of contact with such tube; and a switch controlling the welding circuit, said electromagnetic means being operatively connected with said switch.

10. In electric welding mechanism, the combination of guide means adapted to maintain the edges of a preliminarily formed tube or like article in substantial contact; a transformer supported over said means so as to be movable towards and from the same; two electrode rolls carried by and electrically connected with said transformer, said rolls being adapted in one position of said transformer to contact with the respective edges of such tube; adjustable means, whereby the pressure of such contact may be determined; and electromagnetic means controlled by the passage of the tube through the machine adapted to limit movement of said transformer when out of contact with such tube.

11. In electric welding mechanism, the combination of guide means adapted to maintain the edges of a preliminarily formed tube or like article in substantial contact; a transformer supported over said means so as to be movable towards and from the same; two electrode rolls carried by and electrically connected with said transformer, said rolls being adapted in one position of said transformer to contact with the respective edges of such tube; adjustable counterweight means connected with said transformer, whereby the pressure of said rolls on the tube may be determined; a transverse shaft carried by said transformer; a pinion on said shaft; a stationary rack meshing with said pinion; and a brake associated with said shaft whereby the latter may be held against rotation when desired.

12. In electric welding mechanism, the combination of guide means adapted to maintain the edges of a preliminarily formed tube or like article in substantial contact; a transformer supported over said means so as to be movable towards and from the same; two electrode rolls carried by and electrically connected with said transformer, said rolls being adapted in one position of said transformer to contact with the respective edges of such tube; adjustable counterweight means connected with said transformer, whereby the pressure of said rolls on the tube may be determined; a transverse shaft carried by said transformer; a pinion on said shaft; a stationary rack meshing with said pinion; a brake associated with said shaft whereby the latter may be held against rotation when desired; and means controlled by the passage of a tube through the machine adapted to operate said brake.

13. In electric welding mechanism, the combination of guide means adapted to maintain the edges of a preliminarily formed tube or like article in substantial contact; a transformer supported over said means so as to be movable towards and from the same; two electrode rolls carried by and electrically connected with said transformer, said rolls being adapted in one position of said transformer to contact with the respective edges of such tube; adjustable counterweight means connected with said transformer, whereby the pressure of said rolls on the tube may be determined; a transverse shaft carried by said transformer; a pinion on said shaft; a stationary rack meshing with said pinion; a brake associated with said shaft whereby the latter may be held again rotation when desired; and electromagnetic means controlled by the passage of a tube through the machine adapted to operate said brake.

Signed by me this 24th day of October, 1924.

JOHN W. HOLT.